US009842208B2

(12) United States Patent
Mei et al.

(10) Patent No.: US 9,842,208 B2
(45) Date of Patent: Dec. 12, 2017

(54) METHOD, APPARATUS AND SYSTEM FOR DETECTING MALICIOUS PROCESS BEHAVIOR

(71) Applicant: Baidu Online Network Technology (Beijing) Co., Ltd, Beijing (CN)

(72) Inventors: Yinming Mei, Beijing (CN); Yizhi Xie, Beijing (CN); Huaming Yue, Beijing (CN); Hanzhong Hu, Beijing (CN); Tingli Bi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 4 days.

(21) Appl. No.: 14/585,080

(22) Filed: Dec. 29, 2014

(65) Prior Publication Data
US 2015/0310211 A1 Oct. 29, 2015

(30) Foreign Application Priority Data

Apr. 28, 2014 (CN) .......................... 2014 1 0174682

(51) Int. Cl.
*G06F 21/55* (2013.01)
*G06F 21/56* (2013.01)
(Continued)

(52) U.S. Cl.
CPC .............. *G06F 21/55* (2013.01); *G06F 21/56* (2013.01); *G06N 5/048* (2013.01); *H04L 63/145* (2013.01);
(Continued)

(58) Field of Classification Search
CPC ............... H04L 63/1408; H04L 63/145; G06F 2221/034026; G06F 21/50; G06F 21/55; G06F 21/552; G06F 21/56
See application file for complete search history.

(56) References Cited

U.S. PATENT DOCUMENTS 8,006,305 B2 * 8/2011 Aziz ..................... G06F 21/552
726/22
8,220,054 B1 * 7/2012 Lu ......................... G06F 21/566
709/224
(Continued)

FOREIGN PATENT DOCUMENTS

EP 2 469 445 A1 6/2012

OTHER PUBLICATIONS

Extended European Search Report, Application No. 14200492.8, dated Sep. 24, 2015.
(Continued)

*Primary Examiner* — Hadi Armouche
*Assistant Examiner* — Sher A Khan
(74) *Attorney, Agent, or Firm* — Orrick, Herrington & Sutcliffe LLP (57) ABSTRACT

A method, apparatus and system for detecting a malicious process behavior. A detection apparatus monitors a process to obtain behavior information about a target process behavior, and then sends the behavior information to a server, which determines whether the target process behavior is a malicious process behavior. The detection apparatus can receive first operation indication information returned by the server according to a detection result of the target process behavior, and perform an operation on the target process behavior according to the first operation indication information. The target process behavior is subjected to a comprehensive detection by the server according to the behavior information, rather than depending on a specified feature analysis of a single sample of the target process behavior by the detection apparatus, so that malicious process behavior can be detected in time, thereby improving the security performance of the system.

20 Claims, 1 Drawing Sheet

(51) Int. Cl.
*H04L 29/06* (2006.01)
*G06N 5/04* (2006.01)

(52) U.S. Cl.
CPC .... *H04L 63/1408* (2013.01); *G06F 2221/034* (2013.01)

(56) References Cited

U.S. PATENT DOCUMENTS

| | | | | |
|---|---|---|---|---|
| 8,347,386 | B2* | 1/2013 | Mahaffey | 726/23 |
| 8,490,195 | B1* | 7/2013 | Chen | G06F 21/725 705/51 |
| 8,528,086 | B1* | 9/2013 | Aziz | H04L 63/1425 713/176 |
| 8,533,844 | B2* | 9/2013 | Mahaffey | G06F 21/564 709/203 |
| 8,788,407 | B1* | 7/2014 | Singh | G06F 17/30412 705/35 |
| 8,832,228 | B2* | 9/2014 | Luna | G06F 9/5027 709/217 |
| 8,875,294 | B2* | 10/2014 | Golavanov | G06F 21/564 726/22 |
| 8,881,282 | B1* | 11/2014 | Aziz | G06F 21/554 726/23 |
| 9,043,894 | B1* | 5/2015 | Dennison | G06F 21/552 726/11 |
| 9,060,016 | B2* | 6/2015 | Han | H04L 63/1416 |
| 9,355,247 | B1* | 5/2016 | Thioux | G06F 21/55 |
| 9,380,066 | B2* | 6/2016 | Hohndel | H04L 63/1416 |
| 2002/0019767 | A1* | 2/2002 | Babbitt | G07C 13/00 705/12 |
| 2003/0105975 | A1* | 6/2003 | Nagoya | G06F 21/567 726/24 |
| 2006/0021054 | A1* | 1/2006 | Costa | G06F 21/566 726/25 |
| 2008/0256230 | A1* | 10/2008 | Handley | H04L 63/145 709/224 |
| 2008/0256631 | A1* | 10/2008 | Zvi | G06F 21/56 726/22 |
| 2011/0023118 | A1 | 1/2011 | Wright | |
| 2011/0271341 | A1* | 11/2011 | Satish | G06F 21/552 726/23 |
| 2012/0017275 | A1* | 1/2012 | Harmonen | H04L 63/1425 726/24 |
| 2012/0159628 | A1* | 6/2012 | Dai | G06F 21/552 726/24 |
| 2012/0174227 | A1* | 7/2012 | Mashevsky | G06F 21/562 726/24 |
| 2012/0192275 | A1* | 7/2012 | Oliver | G06F 21/51 726/24 |
| 2012/0324575 | A1* | 12/2012 | Choi | G06F 21/52 726/23 |
| 2013/0097706 | A1* | 4/2013 | Titonis | G06F 21/56 726/24 |
| 2013/0145463 | A1 | 6/2013 | Ghosh et al. | |
| 2013/0185800 | A1* | 7/2013 | Miller | G06F 21/568 726/24 |
| 2013/0191469 | A1* | 7/2013 | Dichiu | H04L 51/12 709/206 |
| 2013/0247187 | A1 | 9/2013 | Hsiao et al. | |
| 2013/0304710 | A1* | 11/2013 | Nachev | G06K 9/6284 707/690 |
| 2013/0326620 | A1* | 12/2013 | Merza | H04L 63/1408 726/22 |
| 2014/0053261 | A1 | 2/2014 | Gupta et al. | |
| 2014/0068768 | A1* | 3/2014 | Lospinuso | G06F 21/562 726/23 |
| 2014/0283038 | A1* | 9/2014 | Call | H04L 63/1441 726/22 |
| 2015/0007312 | A1* | 1/2015 | Pidathala | H04L 63/145 726/22 |
| 2015/0052606 | A1* | 2/2015 | Romero Bueno | H04L 63/145 726/23 |
| 2015/0096022 | A1* | 4/2015 | Vincent | G06F 21/566 726/23 |
| 2015/0304351 | A1* | 10/2015 | Oberheide | H04L 63/1433 726/25 |

OTHER PUBLICATIONS

Communication pursuant to Article 94 (3) EPC, European Patent Application No. 14 200 492.8, dated Apr. 26, 2017.

* cited by examiner

METHOD, APPARATUS AND SYSTEM FOR DETECTING MALICIOUS PROCESS BEHAVIOR

CROSS-REFERENCE TO RELATED APPLICATIONS

The present application claims priority to Chinese Patent Application No. CN201410174682.8, filed on Apr. 28, 2014, the entire disclosure of which is incorporated herein by reference in its entirety and for all purposes.

TECHNICAL FIELD

The present invention relates to computer technology, and in particular to a method, apparatus and system for detecting a malicious process behavior.

BACKGROUND

Viruses are data which is compiled or inserted in an application program for destroying system functions, will affect the normal use of the application program, are able to self-replicate, and generally take the form of a set of instructions or program codes. Viruses, also called computer viruses, may comprise but are not limited to Trojans, backdoors, local area network worms, mail worms, spyware, infective viruses or Rootkits/Bootkits, which have the characteristics of destruction, replication and infection.

However, in some cases, for example, where antivirus software has a limited monitoring capability, or there are various viruses and they show rapid growth, it is hard to detect malicious process behaviors caused by viruses after running in time.

SUMMARY

A method, apparatus and system for detecting a malicious process behavior are provided in a plurality of aspects of the present invention, so as to improve the security performance of the system.

In one aspect of the present invention, provided is a method for detecting a malicious process behavior, comprising:

a detection apparatus monitoring a process behavior of a process to obtain behavior information about a target process behavior;

the detection apparatus sending the behavior information about the target process behavior to a server, so that the server detects the target process behavior according to the behavior information about the target process behavior so as to determine whether the target process behavior is a malicious process behavior;

the detection apparatus receiving first operation indication information returned by the server according to the detection result of the target process behavior; and the detection apparatus performing an operation on the target process behavior according to the first operation indication information.

In the aspect as mentioned above and any possible implementation, further provided is an implementation, wherein the step of the detection apparatus monitoring a process behavior of a process to obtain behavior information about a target process behavior comprises:

the detection apparatus monitoring the process behavior of the process according to preconfigured identification information about suspicious target process behaviors to obtain the behavior information about the target process behavior.

In the aspect as mentioned above and any possible implementation, further provided is an implementation, wherein the behavior information about the target process behavior includes at least one of the following information:

originator information about the target process behavior;
target object information about the target process behavior;
additional information about the target process behavior; and
identification information about the target process behavior.

In the aspect as mentioned above and any possible implementation, further provided is an implementation, wherein after the detection apparatus sends the behavior information about the target process behavior to a server, so that the server detects the target process behavior according to the behavior information about the target process behavior so as to determine whether the target process behavior is a malicious process behavior, further comprised are the following steps:

the detection apparatus receiving second operation indication information returned by the server according to the detection results of other process behaviors relevant to the target process behavior, the detection results of the other process behaviors being obtained by the server detecting the other process behaviors, so as to determine whether the other process behaviors relevant to the target process behavior are malicious process behaviors; and the detection apparatus performing an operation on the behavior results corresponding to the other process behaviors according to the second operation indication information.

In the aspect as mentioned above and any possible implementation, further provided is an implementation, wherein the step of the server detecting the target process behavior according to the behavior information about the target process behavior to determine whether the target process behavior is a malicious process behavior comprises:

the server detecting the target process behavior according to the behavior information about the target process behavior and behavior information about at least one malicious process behavior which has been determined, so as to determine whether the target process behavior is a malicious process behavior; or the server detecting the target process behavior according to the behavior information about the target process behavior and behavior information about other target process behaviors sent from other detection apparatuses, so as to determine whether the target process behavior is a malicious process behavior.

In another aspect of the present invention, provided is an apparatus for detecting a malicious process behavior, comprising:

a monitoring unit for monitoring a process behavior of a process to obtain behavior information about a target process behavior;

a sending unit for sending the behavior information about the target process behavior to a server, so that the server detects the target process behavior according to the behavior information about the target process behavior to determine whether the target process behavior is a malicious process behavior;

a receiving unit for receiving first operation indication information returned by the server according to the detection result of the target process behavior; and an operation unit for performing an operation on the target process behavior according to the first operation indication information.

In the aspect as mentioned above and any possible implementation, further provided is an implementation, wherein the monitoring unit is specifically used for monitoring the process behavior of the process according to preconfigured identification information about suspicious target process behaviors to obtain the behavior information about the target process behavior.

In the aspect as mentioned above and any possible implementation, further provided is an implementation, wherein the behavior information about the target process behavior obtained by the monitoring unit includes at least one of the following information:

originator information about the target process behavior;

target object information about the target process behavior;

additional information about the target process behavior; and identification information about the target process behavior.

In the aspect as mentioned above and any possible implementation, further provided is an implementation, wherein the receiving unit is also used for receiving second operation indication information returned by the server according to the detection results of other process behaviors relevant to the target process behavior, the detection results of the other process behaviors being obtained by the server detecting the other process behaviors, so as to determine whether the other process behaviors relevant to the target process behavior are malicious process behaviors; and the operation unit is also used for performing an operation on the behavior results corresponding to the other process behaviors according to the second operation indication information.

In another aspect of the present invention, provided is a system for detecting a malicious process behavior, comprising a server and an apparatus for detecting a malicious process behavior provided in the above aspect; wherein, the server is used for detecting the target process behavior according to the behavior information about the target process behavior to determine whether the target process behavior is a malicious process behavior.

In the aspect as mentioned above and any possible implementation, further provided is an implementation, wherein the server is specifically used for detecting the target process behavior according to the behavior information about the target process behavior and behavior information about at least one malicious process behavior which has been determined, so as to determine whether the target process behavior is a malicious process behavior; or detecting the target process behavior according to the behavior information about the target process behavior and behavior information about other target process behaviors sent from other detection apparatuses, so as to determine whether the target process behavior is a malicious process behavior.

It can be seen from the technical solutions mentioned above that, by means of a detection apparatus monitoring a process behavior of a process to obtain behavior information about a target process behavior, and then sending the behavior information about the target process behavior to a server, and the server detecting the target process behavior according to the behavior information about the target process behavior to determine whether the target process behavior is a malicious process behavior, so that the detection apparatus can receive first operation indication information returned by the server according to the detection result of the target process behavior, and then perform an operation on the target process behavior according to the first operation indication information, in the embodiments of the present invention, the target process behavior is subjected to comprehensive detection by the server according to the behavior information about the target process behavior, rather than depending on a specified feature analysis of a single sample of the target process behavior by the detection apparatus, so that malicious process behavior can be detected in time, thereby improving the security performance of the system.

Furthermore, since the server can actively detect other process behaviors relevant to the target process behavior to determine whether the other process behaviors are malicious process behaviors, so that other process behaviors, which are likewise malicious process behaviors and are not reported by the detection apparatus, can be detected in time, using the technical solutions provided in the present invention can effectively improve the reliability and flexibility of detection and further improve the security of the system.

Furthermore, since the server can detect an unknown target process behavior using at least one malicious process behavior which has been determined or other target process behavior sent from other detection apparatuses, so as to determine whether the unknown target process behavior is a malicious process behavior, so that malicious process behaviors can be detected in time, using the technical solutions provided in the present invention can effectively improve the reliability and flexibility of detection and further improve the security of the system.

BRIEF DESCRIPTION OF THE ACCOMPANYING DRAWINGS

In order to illustrate the technical solutions in the embodiments of the present invention more clearly, the accompanying drawings required to be used in the description of the embodiments or the prior art are briefly introduced below. Obviously, the accompanying drawings in the following description are some embodiments of the present invention, and those of ordinary skill in the art may further obtain other drawings according to these accompanying drawings without making inventive efforts.

DETAILED DESCRIPTION OF THE PREFERRED EMBODIMENTS

In order to make the objectives, technical solutions and advantages of the embodiments of the present invention more clear, the technical solutions in the embodiments of the present invention will be described clearly and completely below in combination with the accompanying drawings in the embodiments of the present invention. Obviously, the described embodiments are some of the embodiments of the present invention rather than all the embodiments. All other embodiments obtained by those of ordinary skill in the art based on the embodiments of the present invention without making inventive efforts are within the scope of protection of the present invention.

In addition, the term "and/or" herein is merely an association relationship describing associated objects, and indicates that three relationships may exist, for example, A and/or B may represent: three cases where A exists alone, A and B exist simultaneously, and B exists alone. In addition, the character "/" herein generally indicates an "or" relationship between associated objects.

Figure 1:
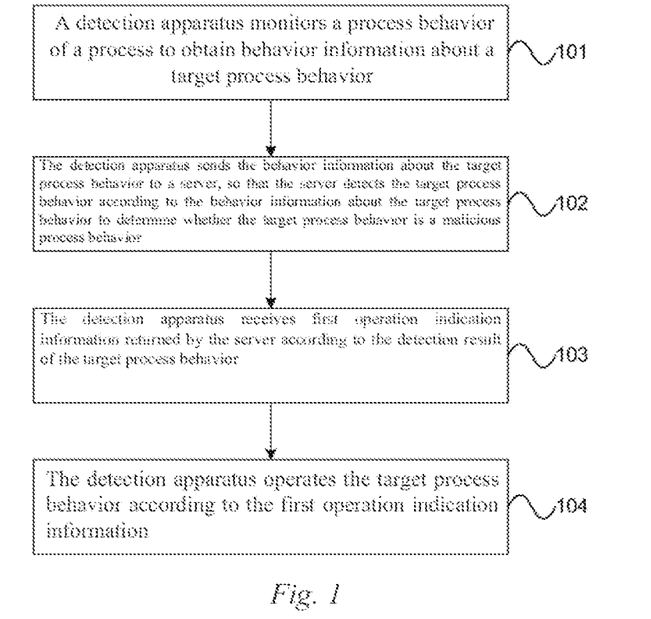
FIG. 1 is a schematic flowchart of a method for detecting a malicious process behavior provided in an embodiment of the present invention.

FIG. 1 is a schematic flowchart of a method for detecting a malicious process behavior provided in an embodiment of the present invention, as shown in FIG. 1.

101. A detection apparatus monitors a process behavior of a process to obtain behavior information about a target process behavior.

102. The detection apparatus sends the behavior information about the target process behavior to a server, so that the server detects the target process behavior according to the behavior information about the target process behavior to determine whether the target process behavior is a malicious process behavior.

103. The detection apparatus receives first operation indication information returned by the server according to the detection result of the target process behavior.

104. The detection apparatus perform an operation on the target process behavior according to the first operation indication information.

The first operation indication information may comprise but is not limited to:

indication information for indicating that the target process behavior is a malicious process behavior, and prompt information for indicating an interception operation on the target process behavior; or indication information for indicating that the target process behavior is a non-malicious process behavior, and prompt information for indicating a release operation on the target process behavior.

It needs to be noted that the execution body of 101-103, i.e. the detection apparatus, may be located in a local client to carry out an off-line operation for monitoring the process.

It can be understood that, the client may be an application program installed on a terminal, e.g. antivirus software, or may also be a webpage of a browser, and all objective forms of existence capable of implementing process monitoring to provide a safe system environment are permissible; this embodiment imposes no restrictions in this respect.

Thus, by means of a detection apparatus monitoring a process behavior of a process to obtain behavior information about a target process behavior, and then sending the behavior information about the target process behavior to a server, and the server detecting the target process behavior according to the behavior information about the target process behavior to determine whether the target process behavior is a malicious process behavior, so that the detection apparatus can receive first operation indication information returned by the server according to the detection result of the target process behavior, and then perform an operation on the target process behavior according to the first operation indication information, the target process behavior is subjected to a comprehensive detection by the server according to the behavior information about the target process behavior, rather than depending on a specified feature analysis of a single sample of the target process behavior by the detection apparatus, so that malicious process behavior can be detected in time, thereby improving the security performance of the system.

Optionally, in a possible implementation of this embodiment, in 101, to monitor a process behavior of a process the detection apparatus may use a preconfigured suspicious behavior decision-making library which stores relevant information about suspicious process behaviors which have been determined, e.g. identification information about suspicious target process behaviors and originator information about suspicious target process behaviors, so as to determine whether the process behavior of the monitored process is a suspicious process behavior, i.e. the target process behavior, and then obtain behavior information about the target process behavior.

It can be understood that, since the monitoring purpose of the detection apparatus is merely to determine a target process behavior, rather than determining a malicious process behavior, the configuration strategy of the suspicious behavior decision-making library may control the monitoring range to be appropriately larger, so as to effectively avoid under-reporting.

Optionally, in a possible implementation of this embodiment, in 101, the behavior information about the target process behavior obtained by the detection apparatus may comprise but is not limited to at least one of the following information:

originator information about the target process behavior;

target object information about the target process behavior;

additional information about the target process behavior; and identification information about the target process behavior.

In this case, the originator information about the target process behavior may be an object identifier for initiating a process behavior.

The target object information about the target process behavior may be an object identifier to be applied by the process behavior.

The additional information about the target process behavior may be data information generated by the process behavior.

The identification information about the target process behavior may be an identifier (ID) of the process behavior.

Optionally, in a possible implementation of this embodiment, in 101, the detection apparatus may specifically monitor the process behaviors of all processes in the system to obtain behavior information about the target process behavior.

Optionally, in a possible implementation of this embodiment, in 101, the detection apparatus may specifically monitor the process behaviors of part of the processes in the system according to preconfigured identification information about suspicious target process behaviours to obtain behavior information about the target process behavior.

Optionally, in a possible implementation of this embodiment, after 102, the server receives the behavior information about the target process behavior sent from the detection apparatus, and then may detect the target process behavior according to the behavior information about the target process behavior, so as to determine whether the target process behavior is a malicious process behavior.

Specifically, the server may specifically detect the target process behavior according to the behavior information about the target process behavior and using a preconfigured malicious behavior decision-making library for matching, the malicious behavior decision-making library storing behaviour information about malicious process behaviors which have been determined, so as to determine whether the target process behavior is a malicious process behavior.

If a malicious process behavior coinciding with the behavior information about the target process behavior is matched, this indicates that this target process behavior is a malicious process behavior, and then the server can determine that the target process behavior is a malicious process behavior.

If no malicious process behavior coinciding with the behavior information about the target process behavior is matched, this indicates that this target process behavior is an unknown process behavior, and then the server may further detect the unknown target process behavior using at least one malicious process behavior which has been determined or other target process behavior sent from other detection apparatuses.

Specifically, the server may specifically detect the target process behavior according to the behavior information about the target process behavior and behavior information about at least one malicious process behavior which has been determined, so as to determine whether the target process behavior is a malicious process behavior.

For example, the server may specifically carry out clustering analysis of the behavior information about the at least one malicious process behavior which has been determined, so as to obtain similar behavior information for determining whether the unknown target process behavior is a malicious process behavior. For example, the behavior information about the at least one malicious process behavior is clustered according to target object information about the target process behavior, additional information about the target process behavior, and identification information about the target process behavior, so as to obtain originator information about similar target process behaviors.

Specifically, the server may specifically detect the target process behavior according to the behavior information about the target process behavior and behavior information about other target process behaviors sent from other detection apparatuses, so as to determine whether the target process behavior is a malicious process behavior.

For example, the server may specifically carry out clustering analysis of the behavior information about the target process behavior and behavior information about other target process behaviors sent from other detection apparatuses, so as to obtain a clustering result. Further, the clustering result of the behavior information about the target process behavior is further analyzed to determine whether the unknown target process behavior is a malicious process behavior.

Thus, since the server can detect an unknown target process behavior using at least one malicious process behavior which has been determined or other target process behavior sent from other detection apparatuses, so as to determine whether the unknown target process behavior is a malicious process behavior, malicious process behaviors can be detected in time, thereby effectively improving the reliability and flexibility of detection and further improving the security of the system.

It can be understood that, if the server determines that the unknown target process behavior is a malicious process behavior, the server may further add the behavior information about the determined target process behavior to the malicious behavior decision-making library, so as to improve the decision-making capability of the malicious behavior decision-making library.

Optionally, in a possible implementation of this embodiment, the server may further detect other process behaviors relevant to the target process behavior to determine whether the other process behaviors are malicious process behaviors.

Thus, since the server can actively detect other process behaviors relevant to the target process behavior to determine whether the other process behaviors are malicious process behaviors, so that other process behaviors, which are likewise malicious process behaviors and are not reported by the detection apparatus, can be detected in time, it is possible to effectively improve the reliability and flexibility of detection and further improve the security of the system.

Accordingly, in a possible implementation of this embodiment, after 102, the detection apparatus may further receive second operation indication information returned by the server according to the detection results of other process behaviors relevant to the target process behavior, the detection results of the other process behaviors being obtained by the server detecting the other process behaviors, so as to determine whether the other process behaviors relevant to the target process behavior are malicious process behaviors. Then, the detection apparatus may perform an operation on the behavior results corresponding to the other process behaviors according to the second operation indication information.

The second operation indication information may comprise but is not limited to:

indication information for indicating that the other process behaviors are malicious process behaviors, and prompt information for indicating to perform an operation on the behavior results corresponding to the other process behaviors; or indication information for indicating that the other process behavior is a non-malicious process behavior.

It can be understood that the malicious behavior decision-making library may further store defensive checking and killing solutions for each malicious process behavior. Thus, while the server sends the operation indication information, i.e. the first or second operation indication information to the detection apparatus, the server may further send a corresponding defensive checking and killing solution to the detection apparatus, so that the detection apparatus can effectively carry out antivirus processing according to the defensive checking and killing solution.

In this embodiment, by means of a detection apparatus monitoring a process behavior of a process to obtain behavior information about a target process behavior, and then sending the behavior information about the target process behavior to a server, and the server detecting the target process behavior according to the behavior information about the target process behavior to determine whether the target process behavior is a malicious process behavior, so that the detection apparatus can receive first operation indication information returned by the server according to the detection result of the target process behavior, and then perform an operation on the target process behavior according to the first operation indication information, the target process behavior is subjected to a comprehensive detection by the server according to the behavior information about the target process behavior, rather than depending on a specified feature analysis of a single sample of the target process behavior by the detection apparatus, so that malicious process behavior can be detected in time, thereby improving the security performance of the system.

Furthermore, since the server can actively detect other process behaviors relevant to the target process behavior to determine whether the other process behaviors are malicious process behaviors, so that other process behaviors, which are likewise malicious process behaviors and are not reported by the detection apparatus, can be detected in time, using the technical solutions provided in the present invention can effectively improve the reliability and flexibility of detection and further improve the security of the system.

Furthermore, since the server can detect an unknown target process behavior using at least one malicious process behavior which has been determined or other target process behavior sent from other detection apparatuses, so as to determine whether the unknown target process behavior is a malicious process behavior, so that malicious process behaviors can be detected in time, using the technical solutions provided in the present invention can effectively improve the reliability and flexibility of detection and further improve the security of the system.

It shall be noted that, regarding the foregoing method embodiments, for the sake of simple description, the methods are described as a series of action combinations, but those of ordinary skill in the art shall know that the present invention is not limited to the action sequence described, because according to the present invention, some steps may be performed in other sequences or performed simultaneously. Secondly, those of ordinary skill in the art shall also know that the embodiments described in the description are all preferred embodiments, and the actions and modules involved are not necessarily required in the present invention.

In the embodiments above, the description of each embodiment has its own emphasis, and for a part of a certain embodiment that is not detailed, reference can be made to the relevant description of other embodiments.

Figure 2:
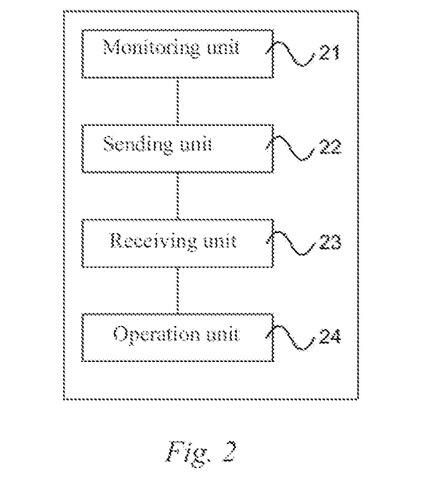
FIG. 2 is a schematic structural diagram of an apparatus for detecting a malicious process behavior provided in another embodiment of the present invention.

FIG. 2 is a schematic structural diagram of an apparatus for detecting a malicious process behavior provided in another embodiment of the present invention, as shown in FIG. 2. The apparatus for detecting a malicious process behavior in this embodiment may comprise a monitoring unit 21, a sending unit 22, a receiving unit 23, and an operation unit 24. In this case, the monitoring unit 21 is used for monitoring a process behavior of a process to obtain behavior information about a target process behavior.

The sending unit 22 is used for sending the behavior information about the target process behavior to a server, so that the server detects the target process behavior according to the behavior information about the target process behavior to determine whether the target process behavior is a malicious process behavior.

The receiving unit 23 is used for receiving first operation indication information returned by the server according to the detection result of the target process behavior.

The operation unit 24 is used for performing an operation on the target process behavior according to the first operation indication information.

The first operation indication information may comprise but is not limited to:

indication information for indicating that the target process behavior is a malicious process behavior, and prompt information for indicating an interception operation on the target process behavior; or indication information for indicating that the target process behavior is a non-malicious process behavior, and prompt information for indicating a release operation on the target process behavior.

It needs to be noted that the apparatus for detecting a malicious process behavior provided in this embodiment may be located in a local client to carry out an off-line operation for monitoring the process.

It can be understood that the client may be an application program installed on a terminal, e.g. antivirus software, or may also be a webpage of a browser, and all objective forms of existence capable of implementing process monitoring to provide a safe system environment are permissible; this embodiment imposes no restrictions in this respect.

Thus, by means of a monitoring unit monitoring a process behavior of a process to obtain behavior information about a target process behavior, and then a sending unit sending the behavior information about the target process behavior to a server, and the server detecting the target process behavior according to the behavior information about the target process behavior to determine whether the target process behavior is a malicious process behavior, so that a receiving unit can receive first operation indication information returned by the server according to the detection result of the target process behavior, and then an operation unit performing an operation on the target process behavior according to the first operation indication information, the target process behavior is subjected to a comprehensive detection by the server according to the behavior information about the target process behavior, rather than depending on a specified feature analysis of a single sample of the target process behavior by the detection apparatus, so that malicious process behavior can be detected in time, thereby improving the security performance of the system.

Optionally, in a possible implementation of this embodiment, to monitor a process behavior of a process the monitoring unit 21 may use a preconfigured suspicious behavior decision-making library which stores relevant information about suspicious process behaviors which have been determined, e.g. identification information about suspicious target process behaviors and originator information about suspicious target process behaviors, so as to determine whether the process behavior of the monitored process is a suspicious process behavior, i.e. the target process behavior, and further obtain behavior information about the target process behavior.

It can be understood that, since the monitoring purpose of the monitoring unit 21 is merely to determine a target process behavior, rather than determining a malicious process behavior, the configuration strategy of the suspicious behavior decision-making library may control the monitoring range to be appropriately larger, so as to effectively avoid under-reporting.

Optionally, in a possible implementation of this embodiment, the behavior information about the target process behavior obtained by the monitoring unit 21 may comprise but is not limited to at least one of the following information:

originator information about the target process behavior;

target object information about the target process behavior;

additional information about the target process behavior; and identification information about the target process behavior.

In this case, the originator information about the target process behavior may be an object identifier for initiating a process behavior.

The target object information about the target process behavior may be an object identifier to be applied by the process behavior.

The additional information about the target process behavior may be data information generated by the process behavior.

The identification information about the target process behavior may be an identifier (ID) of the process behavior.

Optionally, in a possible implementation of this embodiment, the monitoring unit 21 may specifically monitor the process behaviors of all processes in the system to obtain behavior information about the target process behavior.

Optionally, in a possible implementation of this embodiment, the monitoring unit 21 may specifically monitor the process behaviors of part of the processes in the system according to preconfigured identification information about suspicious target process behaviours to obtain behavior information about the target process behavior.

Optionally, in a possible implementation of this embodiment, the server receives the behavior information about the target process behavior sent from the detection apparatus, and then may detect the target process behavior according to the behavior information about the target process behavior, so as to determine whether the target process behavior is a malicious process behavior.

Specifically, the server may specifically detect the target process behavior according to the behavior information about the target process behavior and using a preconfigured malicious behavior decision-making library for matching, the malicious behavior decision-making library storing behaviour information about malicious process behaviors which have been determined, so as to determine whether the target process behavior is a malicious process behavior.

If a malicious process behavior coinciding with the behavior information about the target process behavior is matched, this indicates that this target process behavior is a malicious process behavior, and then the server can determine that the target process behavior is a malicious process behavior.

If no malicious process behavior coinciding with the behavior information about the target process behavior is matched, this indicates that this target process behavior is an unknown process behavior, and then the server may further detect the unknown target process behavior using at least one malicious process behavior which has been determined or other target process behavior sent from other detection apparatuses.

Specifically, the server may specifically detect the target process behavior according to the behavior information about the target process behavior and behavior information about at least one malicious process behavior which has been determined, so as to determine whether the target process behavior is a malicious process behavior.

For example, the server may specifically carry out clustering analysis of the behavior information about the at least one malicious process behavior which has been determined, so as to obtain similar behavior information for determining whether the unknown target process behavior is a malicious process behavior. For example, the behavior information about the at least one malicious process behavior is clustered according to target object information about the target process behavior, additional information about the target process behavior, and identification information about the target process behavior, so as to obtain originator information about similar target process behaviors.

Specifically, the server may specifically detect the target process behavior according to the behavior information about the target process behavior and behavior information about other target process behaviors sent from other detection apparatuses, so as to determine whether the target process behavior is a malicious process behavior.

For example, the server may specifically carry out clustering analysis of behavior information about the target process behavior and behavior information about other target process behaviors sent from other detection apparatuses, so as to obtain a clustering result. Further, the clustering result of the behavior information about the target process behavior is further analyzed to determine whether the unknown target process behavior is a malicious process behavior.

Thus, since the server can detect an unknown target process behavior using at least one malicious process behavior which has been determined or other target process behavior sent from other detection apparatuses, so as to determine whether the unknown target process behavior is a malicious process behavior, malicious process behaviors can be detected in time, thereby effectively improving the reliability and flexibility of detection and further improving the security of the system.

It can be understood that, if the server determines that the unknown target process behavior is a malicious process behavior, the server may further add the behavior information about the determined target process behavior to the malicious behavior decision-making library, so as to improve the decision-making capability of the malicious behavior decision-making library.

Optionally, in a possible implementation of this embodiment, the server may further detect other process behaviors relevant to the target process behavior to determine whether the other process behaviors are malicious process behaviors.

Thus, since the server can actively detect other process behaviors relevant to the target process behavior to determine whether the other process behaviors are malicious process behaviors, other process behaviors, which are likewise malicious process behaviors and are not reported by the detection apparatus, can be detected in time, thereby effectively improving the reliability and flexibility of detection and further improving the security of the system.

Accordingly, in a possible implementation of this embodiment, the receiving unit 23 may be further used to receive second operation indication information returned by the server according to the detection results of other process behaviors relevant to the target process behavior, the detection results of the other process behaviors being obtained by the server detecting the other process behaviors, so as to determine whether the other process behaviors relevant to the target process behavior are malicious process behaviors; and the operation unit 24 may be further used to perform an operation on the behavior results corresponding to the other process behaviors according to the second operation indication information.

The second operation indication information may comprise but is not limited to:

indication information for indicating that the other process behaviors are malicious process behaviors, and prompt information for indicating to perform an operation on the behavior results corresponding to the other process behaviors; or indication information for indicating that the other process behavior is a non-malicious process behavior.

It can be understood that the malicious behavior decision-making library may further store defensive checking and killing solutions for each malicious process behavior. Thus, while the server sends the operation indication, i.e. the first or second operation indication information to the detection apparatus, the server may further send a corresponding defensive checking and killing solution to the detection apparatus, so that the detection apparatus can effectively carry out antivirus processing according to the defensive checking and killing solution.

In this embodiment, by means of a monitoring unit monitoring a process behavior of a process to obtain behavior information about a target process behavior, and then a sending unit sending the behavior information about the target process behavior to a server, and the server detecting the target process behavior according to the behavior information about the target process behavior to determine whether the target process behavior is a malicious process behavior, so that a receiving unit can receive first operation indication information returned by the server according to the detection result of the target process behavior, and then an operation unit performing an operation on the target process behavior according to the first operation indication information, the target process behavior is subjected to a comprehensive detection by the server according to the behavior information about the target process behavior, rather than depending on a specified feature analysis of a single sample of the target process behavior by the detection apparatus, so that malicious process behavior can be detected in time, thereby improving the security performance of the system.

Furthermore, since the server can actively detect other process behaviors relevant to the target process behavior to determine whether the other process behaviors are malicious process behaviors, so that other process behaviors, which are likewise malicious process behaviors and are not reported by the detection apparatus, can be detected in time, using the technical solutions provided in the present invention can effectively improve the reliability and flexibility of detection and further improve the security of the system.

Furthermore, since the server can detect an unknown target process behavior using at least one malicious process behavior which has been determined or other target process behavior sent from other detection apparatuses, so as to determine whether the unknown target process behavior is a malicious process behavior, so that malicious process behaviors can be detected in time, using the technical solutions provided in the present invention can effectively improve the reliability and flexibility of detection and further improve the security of the system.

Figure 3:
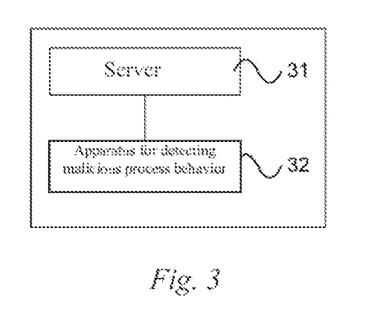
FIG. 3 is a schematic structural diagram of a system for detecting a malicious process behavior provided in another embodiment of the present invention.

FIG. 3 is a schematic structural diagram of a system for detecting a malicious process behavior provided in another embodiment of the present invention, as shown in FIG. 3. The system for detecting a malicious process behavior in this embodiment may comprise a server 31 and an apparatus for detecting a malicious process behavior 32 provided in the embodiment corresponding to FIG. 2. In this case, the server 31 is used for detecting the target process behavior according to the behavior information about the target process behavior to determine whether the target process behavior is a malicious process behavior.

For a detailed description of the detection apparatus 32, reference may be made to the relevant contents in the embodiment corresponding to FIG. 2, which will not be detailed here.

Optionally, in a possible implementation of this embodiment, the server 31 may be specifically used to detect the target process behavior according to the behavior information about the target process behavior and behavior information about at least one malicious process behavior which has been determined, so as to determine whether the target process behavior is a malicious process behavior.

For example, the server 31 may specifically carry out clustering analysis of the behavior information about the at least one malicious process behavior which has been determined, so as to obtain similar behavior information for determining whether the unknown target process behavior is a malicious process behavior. For example, the behavior information about the at least one malicious process behavior is clustered according to target object information about the target process behavior, additional information about the target process behavior, and identification information about the target process behavior, so as to obtain originator information about similar target process behaviors.

Optionally, in a possible implementation of this embodiment, the server 31 may be specifically used to detect the target process behavior according to the behavior information about the target process behavior and behavior information about other target process behaviors sent from other detection apparatuses, so as to determine whether the target process behavior is a malicious process behavior.

For example, the server 31 may specifically carry out clustering analysis of behavior information about the target process behavior and behavior information about other target process behaviors sent from other detection apparatuses, so as to obtain a clustering result. Further, the clustering result of the behavior information about the target process behavior is further analyzed to determine whether the unknown target process behavior is a malicious process behavior.

Thus, since the server can detect an unknown target process behavior using at least one malicious process behavior which has been determined or other target process behavior sent from other detection apparatuses, so as to determine whether the unknown target process behavior is a malicious process behaviour, malicious process behaviors can be detected in time, thereby effectively improving the reliability and flexibility of detection and further improving the security of the system.

It can be understood that, if the server determines that the unknown target process behavior is a malicious process behavior, the server may further add the behavior information about the determined target process behavior to the malicious behavior decision-making library, so as to improve the decision-making capacity of the malicious behavior decision-making library.

Optionally, in a possible implementation of this embodiment, the server 31 may further detect other process behaviors relevant to the target process behavior to determine whether the other process behaviors are malicious process behaviors.

Thus, since the server can actively detect other process behaviors relevant to the target process behavior to determine whether the other process behaviors are malicious process behaviors, so that other process behaviors, which are likewise malicious process behaviors and are not reported by the detection apparatus, can be detected in time, thereby effectively improving the reliability and flexibility of detection and further improving the security of the system.

In this embodiment, by means of a detection apparatus monitoring a process behavior of a process to obtain behavior information about a target process behavior, and then sending the behavior information about the target process behavior to a server, and the server detecting the target process behavior according to the behavior information about the target process behavior to determine whether the target process behavior is a malicious process behavior, so that the detection apparatus can receive first operation indication information returned by the server according to the detection result of the target process behavior, and then perform an operation on the target process behavior according to the first operation indication information, the target process behavior is subjected to a comprehensive detection by the server according to the behavior information about the target process behavior, rather than depending on a specified feature analysis of a single sample of the target process behavior by the detection apparatus, so that malicious process behavior can be detected in time, thereby improving the security performance of the system.

Furthermore, since the server can actively detect other process behaviors relevant to the target process behavior to determine whether the other process behaviors are malicious process behaviors, so that other process behaviors, which are likewise malicious process behaviors and are not reported by the detection apparatus, can be detected in time, using the technical solutions provided in the present invention can effectively improve the reliability and flexibility of detection and further improve the security of the system.

Furthermore, since the server can detect an unknown target process behavior using at least one malicious process behavior which has been determined or other target process behavior sent from other detection apparatuses, so as to determine whether the unknown target process behavior is a malicious process behavior, so that malicious process behaviors can be detected in time, using the technical solutions provided in the present invention can effectively improve the reliability and flexibility of detection and further improve the security of the system.

It may be clearly understood by those of ordinary skill in the art that, for the purpose of convenient and brief description, for the detailed working process of the foregoing system, apparatus and unit, reference may be made to the corresponding process in the method embodiments, which will not be detailed here.

In certain embodiments provided in the present invention, it shall be understood that the disclosed system, apparatus and method may be implemented in other ways. For example, the apparatus embodiments described above are merely illustrative, for example, the division of the units is merely a logical function division, and there may be other forms of division in actual implementation, for example, a plurality of units or components may be combined or may be integrated into another system, or some features may be omitted, or not carried out. Another point is that coupling or direct coupling or communication connection shown or discussed may be an indirect coupling or a communication connection via interfaces, apparatuses, or units, and may be electrical, mechanical, or in other forms.

The units described as separated components may or may not be physically separated, and components displayed as units may or may not be physical units, that is, may be located in one position, or may also be distributed on a plurality of network elements. Some or all of the units may be selected according to actual needs to achieve the objectives of the solutions of the embodiments.

In addition, various functional units in various embodiments of the present invention may be integrated into one processing unit, or each of the units may also exist alone physically, or two or more units may be integrated into one unit. The integrated unit above may be implemented in the form of hardware or may also be implemented in the form of hardware with software functional units.

The integrated unit implemented by software functional units may be stored in a computer readable storage medium. The software functional units are stored in a storage medium and include a plurality of instructions for enabling a computer device (which can be a personal computer, a server, or a network device) or a processor to execute some steps of the method described in embodiments of the present invention. The foregoing storage medium comprises: various media that may store program codes, such as a USB stick, a removable hard disk, a read-only memory (ROM), a random access memory (RAM), a magnetic disk, or an optical disk.

It shall be noted finally that the embodiments above are merely used for illustrating the technical solutions of the present invention rather than limiting same; although the present invention is described in detail with reference to the foregoing embodiments, those of ordinary skill in the art shall understand that they may still make modifications to the technical solutions stated in the various foregoing embodiments or make equivalent replacements of some technical features thereof; and these modifications or replacements shall not result in the essence of the corresponding technical solutions departing from the spirit and scope of the technical solutions of the various embodiments of the present invention.

What is claimed is:

1. A method for detecting a malicious process behavior, comprising:

monitoring one or more process behaviors of a process by a detection apparatus to obtain behavior information about a target process behavior selected from the one or more process behaviors;

sending the behavior information about the target process behavior to a server from the detection apparatus;

carrying out, by the server, clustering analysis of behavior information about a plurality of malicious process behaviors that have been determined by clustering the behavior information about the plurality of malicious process behaviors into a cluster according to the behavior information about the target process behavior including:

a first object identifier that the target process behavior is exerted on;

data information generated by the target process behavior; and an identifier of the target process behavior, to obtain a second object identifier for initiating one or more malicious process behaviors of the plurality of malicious process behaviors in the cluster, the second object identifier being different from the first object identifier;

determining whether the target process behavior is the malicious process behavior based upon the second object identifier;

receiving first operation indication information returned by the server according to a detection result of the target process behavior; and performing an operation on the target process behavior according to the first operation indication information.

2. The method of claim 1, wherein said sending the behavior information to the server comprises:

sending the behavior information to the server; and detecting the target process behavior by the server according to the behavior information about the target process behavior so as to determine whether the target process behavior is the malicious process behavior.

3. The method of claim 2, wherein said detecting the target process behavior includes detecting the target process behavior according to the behavior information about the target process behavior and behavior information about other target process behaviors sent from other detection apparatuses so as to determine whether the target process behavior is the malicious process behavior.

4. The method of claim 3, further comprising:
carrying out clustering analysis of the behavior information about the target process behavior and the behavior information about the other target process behaviors sent from the other detection apparatuses, so as to obtain a clustering result; and
analyzing the clustering result to determine whether the target process behavior is the malicious process behavior.

5. The method of claim 1, wherein said monitoring includes monitoring the process behaviors of the process according to preconfigured identification information about suspicious target process behaviors to obtain the behavior information about the target process behavior.

6. The method of claim 1, wherein the behavior information includes
originator information about the target process behavior,
target object information about the target process behavior,
additional information about the target process behavior,
identification information about the target process behavior,
or a combination thereof.

7. The method of claim 1, further comprising:
receiving second operation indication information returned by the server according to detection results of other process behaviors relevant to the target process behavior, the detection results of the other process behaviors being obtained by the server detecting the other process behaviors so as to determine whether the other process behaviors relevant to the target process behavior are malicious process behaviors; and
performing an operation on behavior results corresponding to the other process behaviors according to the second operation indication information.

8. The method of claim 7, wherein said receiving the second operation indication information and said performing the operation on the behavior results occur after said sending the behavior information to the server.

9. An apparatus for detecting a malicious process behavior, comprising:
one or more hardware processors configured to:
monitor one or more process behaviors of a process to obtain behavior information about a target process behavior selected from the one or more process behaviors;
send the behavior information about the target process behavior to a server, so that the server carries out clustering analysis of behavior information about a plurality of malicious process behaviors that have been determined by clustering the behavior information about the plurality of malicious process behaviors into a cluster according to the behavior information about the target process behavior including:
a first object identifier that the target process behavior is exerted on;
data information generated by the target process behavior; and
an identifier of the target process behavior,
to obtain a second object identifier for initiating one or more malicious process behaviors of the plurality of malicious process behaviors in the cluster, the second object identifier being different from the first object identifier;

determine whether the target process behavior is the malicious process behavior based upon the second object identifier; and
receive first operation indication information returned by the server according to the detection result of the target process behavior; and
perform an operation on the target process behavior according to the first operation indication information.

10. The apparatus of claim 9, wherein said one or more hardware processors are configured to send the behavior information to the server for detecting the target process behavior according to the behavior information about the target process behavior so as to determine whether the target process behavior is the malicious process behavior.

11. The apparatus of claim 9, wherein said one or more hardware processors are configured to monitor the process behaviors of the process according to preconfigured identification information about suspicious target process behaviors to obtain the behavior information about the target process behavior.

12. The apparatus of claim 9, wherein the behavior information about the target process behavior obtained by said one or more hardware processors comprises
originator information about the target process behavior,
target object information about the target process behavior,
additional information about the target process behavior,
identification information about the target process behavior,
or a combination thereof.

13. The apparatus of claim 9, wherein said one or more hardware processors are configured to receive second operation indication information returned by the server according to detection results of other process behaviors relevant to the target process behavior, the detection results of the other process behaviors being obtained by the server detecting the other process behaviors so as to determine whether the other process behaviors relevant to the target process behavior are malicious process behaviours.

14. The apparatus of claim 13, wherein said one or more hardware processors are configured to perform an operation on behavior results corresponding to the other process behaviors according to the second operation indication information.

15. A system for detecting a malicious process behavior, comprising a server and the apparatus of claim 9, wherein the server is used for detecting the target process behavior according to the behavior information about the target process behavior to determine whether the target process behavior is the malicious process behavior.

16. The system of claim 15, wherein said server is configured for detecting the target process behavior according to the behavior information about the target process behavior and behavior information about other target process behaviors sent from other detection apparatuses, so as to determine whether the target process behavior is the malicious process behavior.

17. The system of claim 16, wherein said server is configured for:
carrying out clustering analysis of the behavior information about the target process behavior and the behavior information about the other target process behaviors sent from the other detection apparatuses, so as to obtain a clustering result; and
analyzing the clustering result to determine whether the target process behavior is the malicious process behavior.

18. A non-transitory computer storage medium including at least one program for detecting a malicious process behavior when implemented by a processor, comprising:
- instruction for monitoring one or more process behaviors of a process to obtain behavior information about a target process behavior selected from the one or more process behaviors;
- instruction for sending the behavior information about the target process behavior to a server;
- instruction for the server to carrying out clustering analysis of behavior information about a plurality of malicious process behaviors that have been determined by clustering the behavior information about the plurality of malicious process behaviors into a cluster according to the behavior information about the target process behavior including:
- a first object identifier that the target process behavior is exerted on;
- data information generated by the target process behavior; and
- an identifier of the target process behavior,
- to obtain a second object identifier for initiating one or more malicious process behaviors of the plurality of malicious process behaviors in the cluster, the second object identifier being different from the first object identifier;
- instruction for determining whether the target process behavior is the malicious process behavior based upon the second object identifier;
- instruction for receiving first operation indication information returned by the server according to a detection result of the target process behavior; and
- instruction for performing an operation on the target process behavior according to the first operation indication information.

19. The computer storage medium of claim 18, wherein said instruction for sending the behavior information to the server comprises:
- instruction for sending the behavior information to the server; and
- instruction for detecting the target process behavior by the server according to the behavior information about the target process behavior so as to determine whether the target process behavior is the malicious process behavior.

20. The computer storage medium of claim 18, wherein said instruction for detecting the target process behavior comprises:
- instruction for carrying out clustering analysis of the behavior information about the target process behavior and behavior information about other target process behaviors sent from other detection apparatuses, so as to obtain a clustering result; and
- instruction for analyzing the clustering result to determine whether the target process behavior is the malicious process behavior.

* * * * *